(12) United States Patent
Herlitz et al.

(10) Patent No.: US 8,459,664 B2
(45) Date of Patent: Jun. 11, 2013

(54) STACKABLE RIDE-ON TOY WITH ERGONOMIC SADDLE

(75) Inventors: Todd Herlitz, Chicago, IL (US); Edward Paramadilok, Chicago, IL (US); Joyce Sprau, Chicago, IL (US)

(73) Assignee: Radio Flyer, Inc., Chicago, IL (US)

( * ) Notice: Subject to any disclaimer, the term of this patent is extended or adjusted under 35 U.S.C. 154(b) by 0 days.

(21) Appl. No.: 13/336,719

(22) Filed: Dec. 23, 2011

(65) Prior Publication Data

US 2012/0211955 A1 Aug. 23, 2012

Related U.S. Application Data

(60) Provisional application No. 61/460,371, filed on Dec. 30, 2010.

(51) Int. Cl.
*B62M 1/00* (2010.01)
(52) U.S. Cl.
USPC .......... 280/33.991; 446/69; 446/70; 280/827; 280/33.998

(58) Field of Classification Search
USPC ............. 280/1.13, 7.021, 1.16, 1.165, 1.167, 280/1.188, 33.998, 1.201, 1.208, 87.01, 87.021, 280/8.03, 87.05, 87.041; 446/69, 470, 85, 446/93
See application file for complete search history.

(56) References Cited

U.S. PATENT DOCUMENTS

| | | | |
|---|---|---|---|
| 4,110,866 A * | 9/1978 | Ishii | 16/35 R |
| 5,645,290 A * | 7/1997 | Gaffney et al. | 280/33.998 |
| 6,679,750 B1 * | 1/2004 | Nielsen | 446/85 |

* cited by examiner

*Primary Examiner* — John Walters
*Assistant Examiner* — James Triggs
(74) *Attorney, Agent, or Firm* — McDermott Will Emery LLP

(57) ABSTRACT

A stackable ride-on toy includes a generally hollow body featuring a saddle, a handle and a primarily open bottom. A number of casters are mounted to the body by shrouds positioned adjacent to the primarily open bottom. The saddle includes a saddle valley and saddle peak that are ergonomically sized and shaped. The saddle also serves as a stacking surface adapted to stack the ride-on toy with similar ride-on toys in a nested configuration.

20 Claims, 8 Drawing Sheets

STACKABLE RIDE-ON TOY WITH ERGONOMIC SADDLE

CLAIM OF PRIORITY

This application claims priority to provisional patent application No. 61/460,371, filed Dec. 30, 2010.

FIELD OF THE INVENTION

The present invention generally relates to ride-on toys and, more particularly, to a stackable ride-on toy having an ergonomic saddle.

BACKGROUND

Ride-on toys are popular indoor and outdoor toys for young children. They typically feature a body that is supported by three or more wheels. The body also typically has a saddle or seat portion and a handle, hand grips, handlebars, steering wheel or the like which the child grips while sitting in or on the toy. A child sitting on the toy propels the toy by pushing off the ground with his or her feet. As a result, such toys are also known as "Foot-to-Floor" toys.

Due to the size of their bodies, ride-on toys typically take up a significant amount of space when they are displayed, stored in inventory or shipped. As a result, retailers may keep only a very limited number of such products in stock, necessitating frequent reorders. Furthermore, the retailers may only keep one or two toys on display so that the shelves have to be restocked every time a ride-on toy is sold. In addition, the space involved increases shipping and inventory costs. A user of a large number of such toys, such as a daycare or educational facility, also faces space limitations with regard to the number of ride-on toys that they may have available to children. A stackable ride-on toy would address many of these issues. A need therefore exists for ride-on, toys that are stackable.

A ride-on toy having a saddle or seat portion that is ergonomically designed for a wide range of riders would find broader appeal with children. This would make the toy more practical for purchase by parents as their child may use the toy over a longer age range and thus would not "outgrow" it so quickly. In addition, the ergonomic design of the saddle or seat portion would provide the child rider with more comfort and increase his or her interest and desire in riding the toy. A need therefore also exists for a ride-on toy having an ergonomic seat or saddle portion.

DETAILED DESCRIPTION OF EMBODIMENTS

Figure 1:
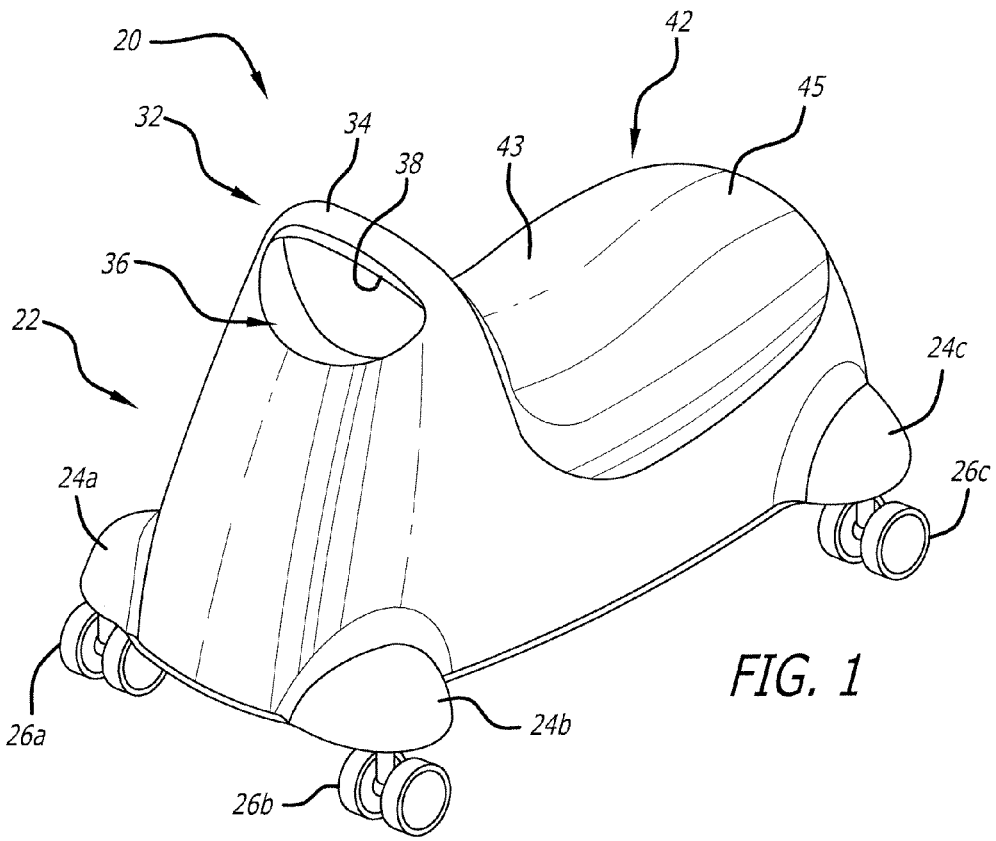
FIG. 1 is a perspective view of an embodiment of the ride-on toy of the invention.
Figure 2:
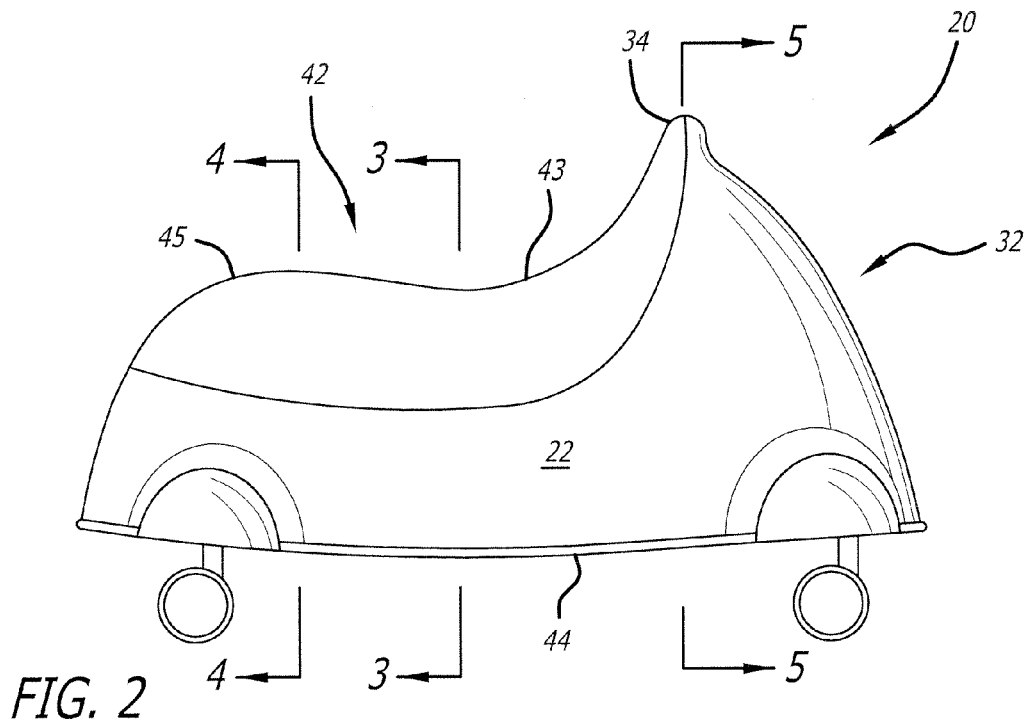
FIG. 2 is a side elevational view of the ride-on toy of FIG. 1.

An embodiment of the ride-on toy of the present invention is indicated in general at 20 in FIGS. 1 and 2. While the ride-on toy is shown as featuring four wheels, it could alternatively feature three wheels or more than four wheels. The ride-on toy features a body, indicated in general at 22 in FIG. 1, that is preferably hollow and molded from plastic. Other materials known in the art may alternatively be used. As explained in greater detail below, the bottom of the body is primarily open to permit stacking of multiple units of the toy.

The body includes caster shrouds 24a-24d (see FIG. 4 for shroud 24d) extending from and positioned near each corner of the body. The shrouds may be integrally molded with the body, or may be constructed separately and attached to the body using fasteners, adhesive or other arrangements or methods known in the art. As will be explained in greater detail below, casters 26a-26d (see FIG. 5 for caster 26d) are mounted to the underside of the shrouds 24a-24d so as to each swivel or pivot 360°. The casters may optionally be restricted so as to swivel through a smaller angle. While casters are illustrated in the figures and described below, it is to be understood that alternative types of wheels could be substituted for the casters, including, but not limited to conventional wheel and axle arrangements.

With reference to FIG. 1, the body also includes a handle, indicated in general at 32, that includes a bridge portion 34, an opening 36 and a gripping portion 38. Bridge portion 34 is preferably integrally molded with the body 22, but may also be formed separately and attached.

Body 22 also includes a seat or saddle, indicated in general at 42, having a saddle valley 43 and a saddle peak 45. The child sits on the saddle, grips handle 32 with his or her hands, and pushes on the surface upon which casters are positioned with his or her feet to propel the ride-on toy. Casters 26a-26d allow the child to steer the toy by pushing towards a desired direction with his or her feet. In addition, by providing casters on both the front and rear of the toy, the rider can create a wide range of motions such as spinning, moving sideways, etc.

Figure 3:
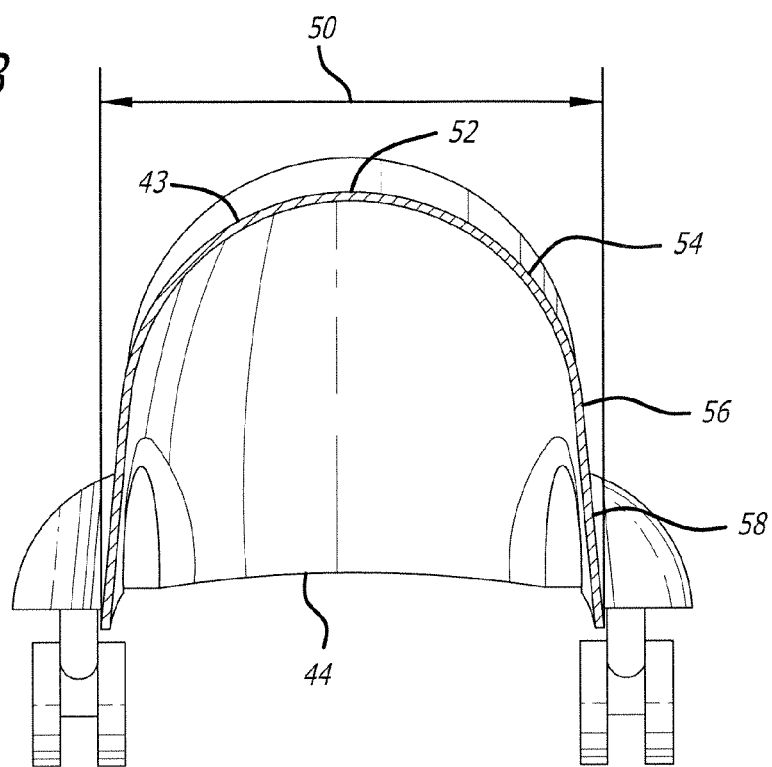
FIG. 3 is a cross sectional view of the saddle valley of the ride-on toy of FIG. 2 taken along line 3-3 of FIG. 2.

As illustrated in FIGS. 2 and 3, the cross section of the saddle valley 43 of the ride-on toy 20 features a generally inverted-U shape, due in part to the open bottom 44 of the body 22. In accordance with the present invention, it has been found that a saddle having a saddle valley 43 with the curves and dimensions listed in Table 1, with reference to FIG. 3, are optimal for providing an ergonomic saddle for child riders ages approximately 1.5 to 3 years.

TABLE 1

Saddle Valley Cross Section Curves and Dimensions

| FIG. 3 Ref. No. | Range (Inches) | Preferred (Inches) |
| --- | --- | --- |
| 50 | 8.0-8.5 | 8.253 |
| 52 | Radius 4.0-4.5 | Radius 4.29 |
| 54 | Radius 3.0-4.0 | Radius 3.53 |
| 56 | Radius 4.0-4.5 | Radius 4.19 |
| 58 | Radius 61.5-62.5 | Radius 62.06 |

In Table 1 and FIG. 3, reference nos. 52, 54, 56 and 58 each indicate a curvature defined by a radius having one end as a pivot point and the other end traversing the curve or arc portion illustrated in FIG. 3. All dimensions provided in tables below that indicate "Radius" are for curves and follow this measurement convention.

Figure 4:
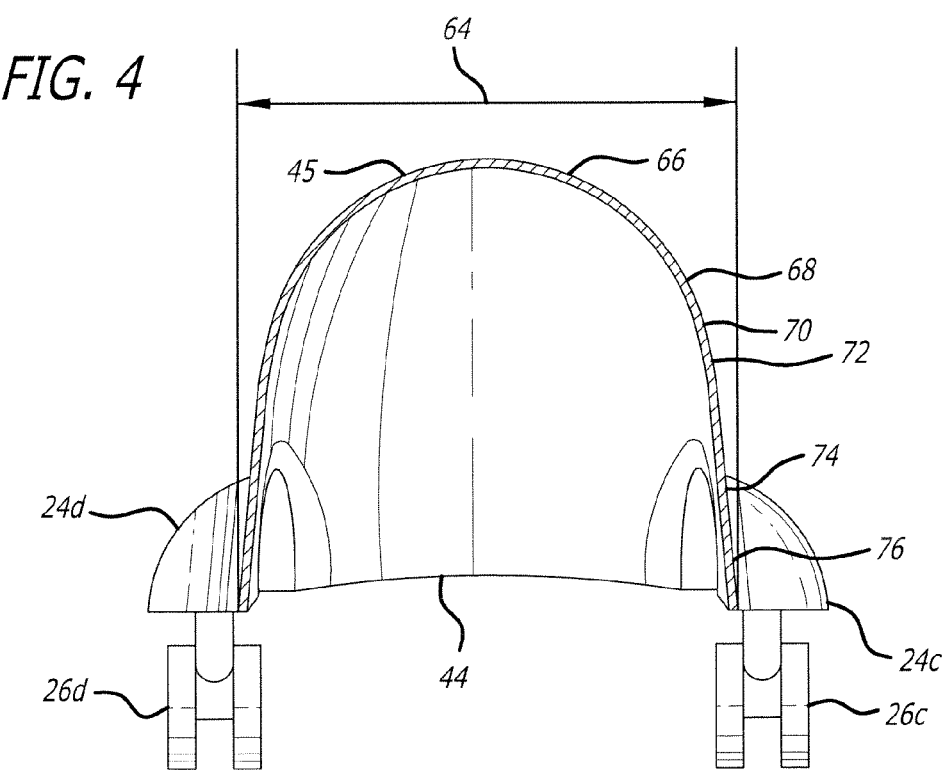
FIG. 4 is a cross sectional view of the saddle peak of the ride-on toy of FIG. 2 taken along line 4-4 of FIG. 2.

The saddle peak of the ride-on toy is indicated at 45 in FIGS. 1, 2 and 4. As illustrated in FIGS. 1 and 2, there is a gradual transition between the saddle valley 43 and the saddle peak 45. A cross section of the saddle peak 45 is shown in. FIG. 4 and preferably features the dimensions listed in Table 2.

TABLE 2

Saddle Peak Cross Section Curves and Dimensions

| FIG. 4 Ref. No. | Range (Inches) | Preferred (Inches) |
| --- | --- | --- |
| 64 | 8.0-8.5 | 8.014 |
| 66 | Radius 4.0-4.5 | Radius 4.36 |
| 68 | Radius 3.0-4.0 | Radius 3.47 |
| 70 | Radius 3.0-4.0 | Radius 3.43 |
| 72 | Radius 4.5-5.5 | Radius 5.11 |
| 74 | Radius 86.5-87.5 | Radius 87.15 |
| 76 | Radius 68-69 | Radius 68.57 |

The saddle 42 tends to fit a younger child best at saddle valley 43. The saddle valley and saddle peak curves and dimensions provided in Tables 1 and 2 provides multiple ergonomic seating positions for the rider as he or she grows older.

Figure 5:
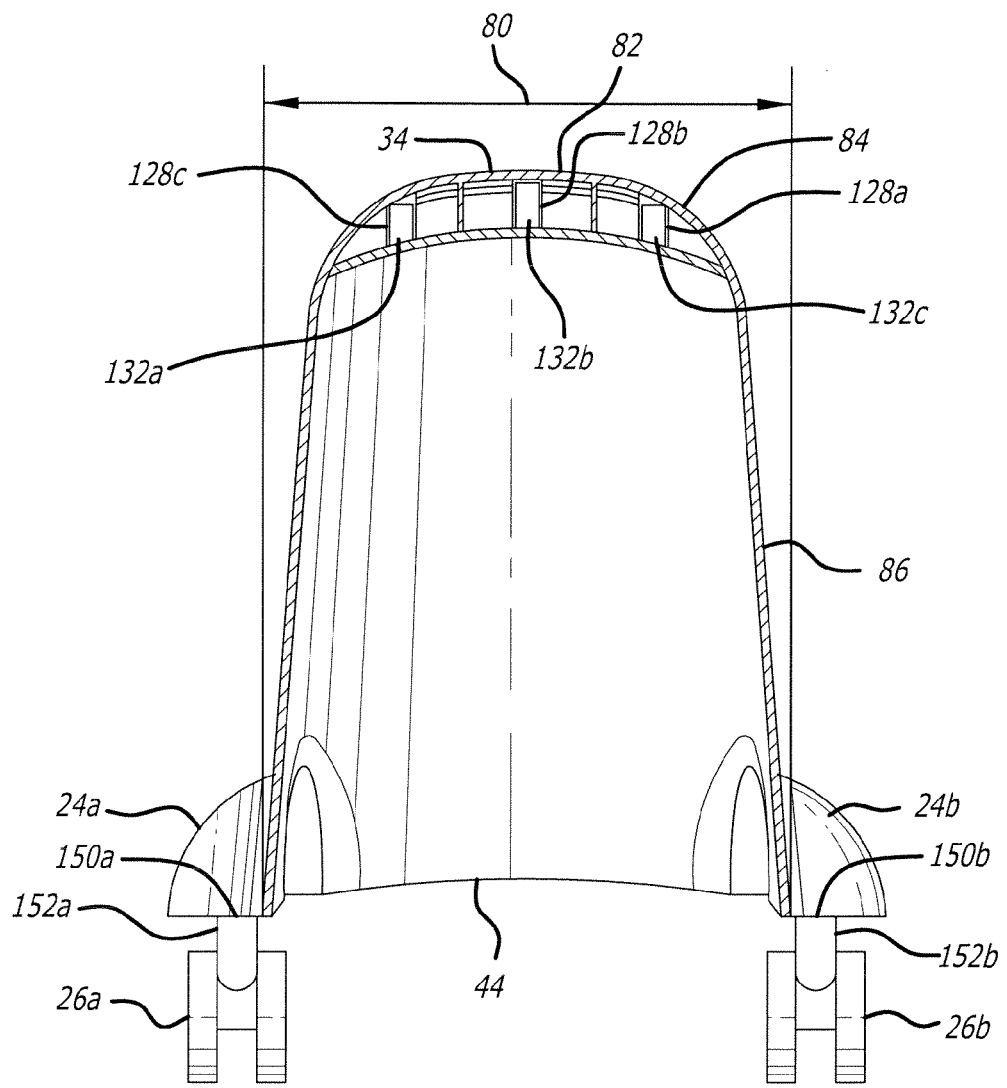
FIG. 5 is a cross sectional view of the handle and corresponding body portion of the ride-on toy of FIG. 2 taken along line 5-5 of FIG. 2.

The preferred dimensions and curves of the bridge 34 of handle 32, and the corresponding portion of the ride-on toy body 22, are listed in Table 3, with reference to FIG. 5.

TABLE 3

Handle Cross Section Curves and Dimensions

| FIG. 5 Ref. No. | Range (Inches) | Preferred (Inches) |
| --- | --- | --- |
| 80 | 7.0-8.5 | 7.791 |
| 82 | Radius 5.5-6.5 | Radius 5.92 |
| 84 | Radius 1.5-2.5 | Radius 2.01 |
| 86 | Radius 275-280 | Radius 276.68 |

Figure 6:
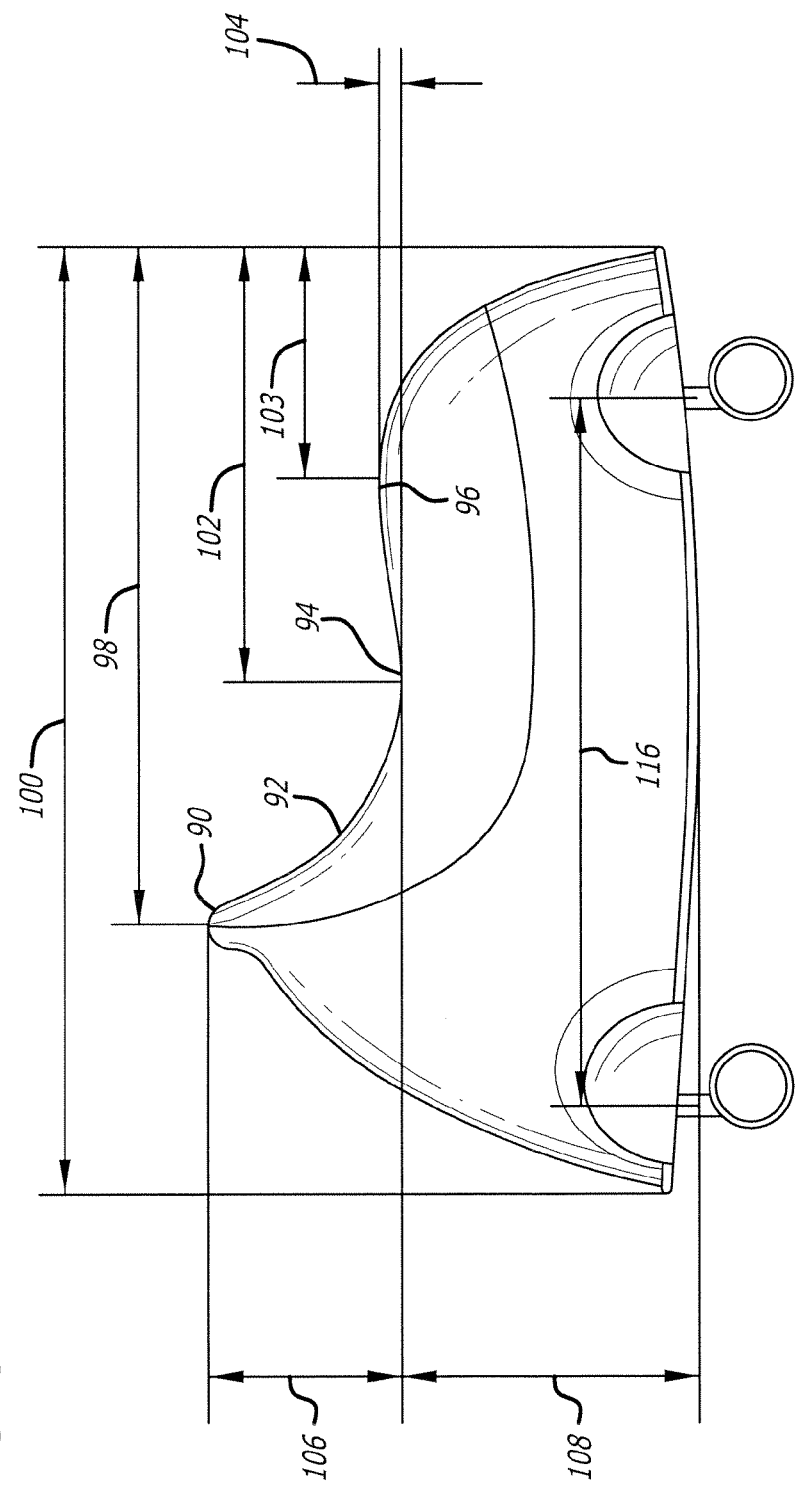
FIG. 6 is a side elevational view of the ride-on toy of FIGS. 1-5.

With reference to FIG. 6, additional preferred dimensions with regard to the length, height, curves and other dimensions of the ride-on toy 20 are illustrated.

TABLE 4

Ride-on Toy Side Elevational View Curves and Dimensions

| FIG. 6 Ref. No. | Range (Inches) | Preferred (Inches) |
| --- | --- | --- |
| 90 | Radius 0.30-0.50 | Radius 0.40 |
| 92 | Radius 5.0-5.5 | Radius 5.34 |
| 94 | Radius 5.0-5.5 | Radius 5.20 |

TABLE 4-continued

Ride-on Toy Side Elevational View Curves and Dimensions

| FIG. 6 Ref. No. | Range (Inches) | Preferred (Inches) |
| --- | --- | --- |
| 96 | Radius 7.0-8.0 | Radius 7.42 |
| 98 | 14.5-15.5 | 15.116 |
| 100 | 20.5-21.5 | 21.181 |
| 102 | 9.0-10.0 | 9.603 |
| 103 | 5.0-6.0 | 5.47 |
| 104 | 0.40-0.60 | 0.524 |
| 106 | 4.0-5.0 | 4.47 |
| 108 | 8.0-10.0 | 9.048 |

The curves and dimensions of Tables 1-4 above provide the embodiment of FIGS. 1-7 with an ergonomic saddle and handle position that enables the ride-on toy to provide a comfortable riding experience for most children ages 1.5 to 3 years.

Figure 7:
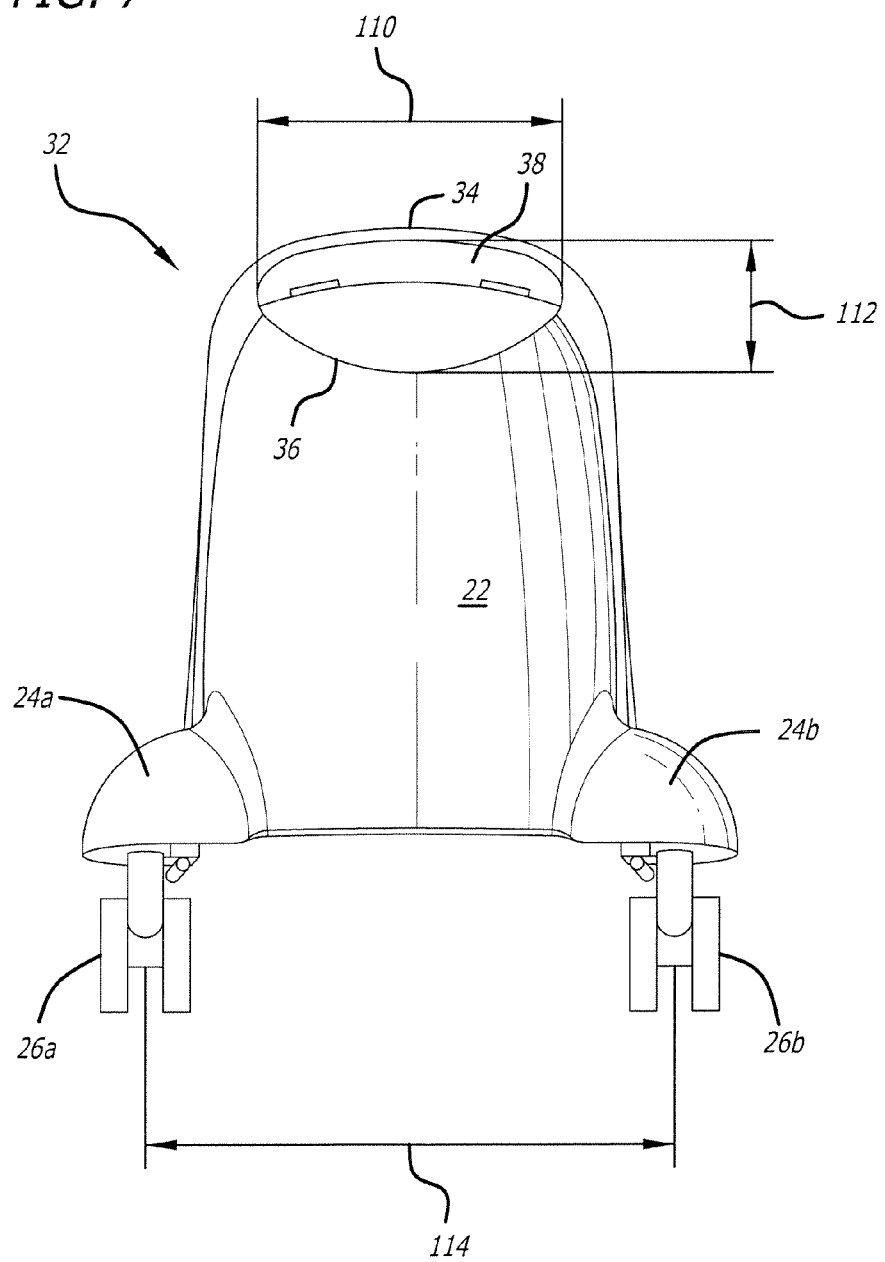
FIG. 7 is a front elevational view of the ride-on toy of FIGS. 1-6.

Preferred dimensions for the opening 36 of the handle 32 are illustrated in FIG. 7, with the opening width, indicated by reference no. 110, being in the range of 4.5 to 5.5 inches, and optimally 4.910 inches. The height of the opening 36 of the handle 32, indicated by reference no. 112, is preferably in the range of 2.0 to 3.0 inches, and optimally 2.279 inches.

The preferred wheelbase of the toy, with the dimensions provided above and as indicated at 116 in FIG. 6, is between 15.5 and 16.5 inches, and optimally 16.25 inches. The preferred track between casters, indicated at 114 in FIG. 7, is between 8.0 and 10.0 inches, and optimally 8.9 inches.

Figure 8:
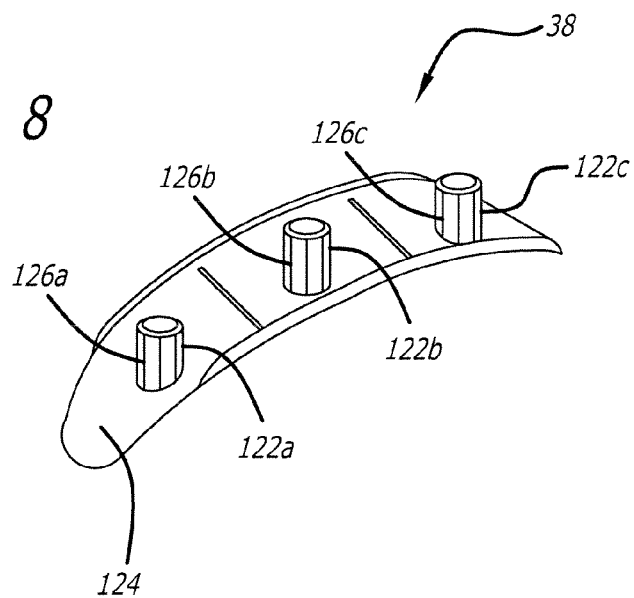
FIG. 8 is an enlarged front top perspective view of the snap-in gripping portion of the handle of the ride-on toy of FIGS. 1-7.
Figure 9:
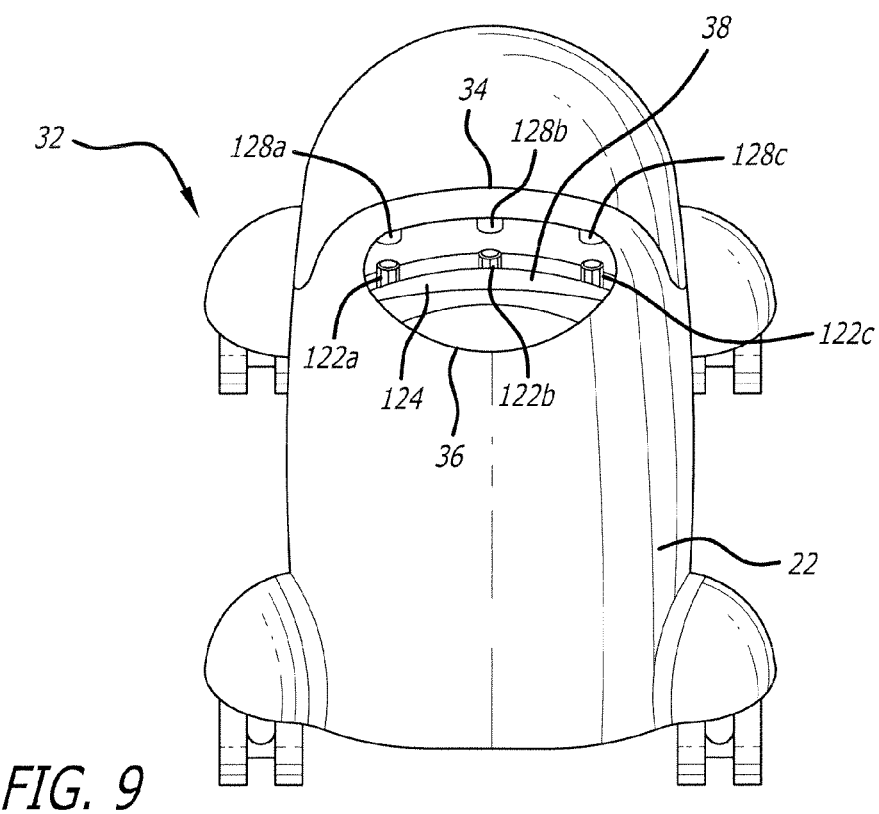
FIG. 9 is a front top perspective view of the snap-in gripping portion of FIG. 8 being installed on the ride-on toy of FIGS. 1-8.

The embodiment of the ride-on toy described above preferably includes a handle 32 having a snap-in gripping portion 38, illustrated in FIGS. 7-9. As illustrated in FIG. 8, the gripping portion, indicated in general at 38, preferably features three knobs 122a, 122b and 122c, positioned on the top surface of arcuate member 124. The knobs preferably include protrusions 126a, 126b and 126c. The gripping portion 38 is preferably constructed of plastic with the knobs 122a-122c, including protrusions 126a-126c, and arcuate member 124 molded as an integral piece. As illustrated in FIGS. 5 and 9, the underside of the handle bridge 34 preferably features bosses, 128a, 128b and 128c having downwardly facing sockets 132a, 132b and 132c, respectively. The open bottoms of the sockets, and the sockets themselves, are sized to receive knobs 122a, 122b and 122c of the gripping portion 38 in an interference fit fashion. As a result, the gripping portion 38 is installed within the handle 32 of the ride-on toy body 22 in a press fit fashion so that no additional screws or fasteners are required. FIG. 9 shows the gripping portion 38 just prior to installation, while FIG. 7 shows the gripping portion 38 after installation.

Figure 10:
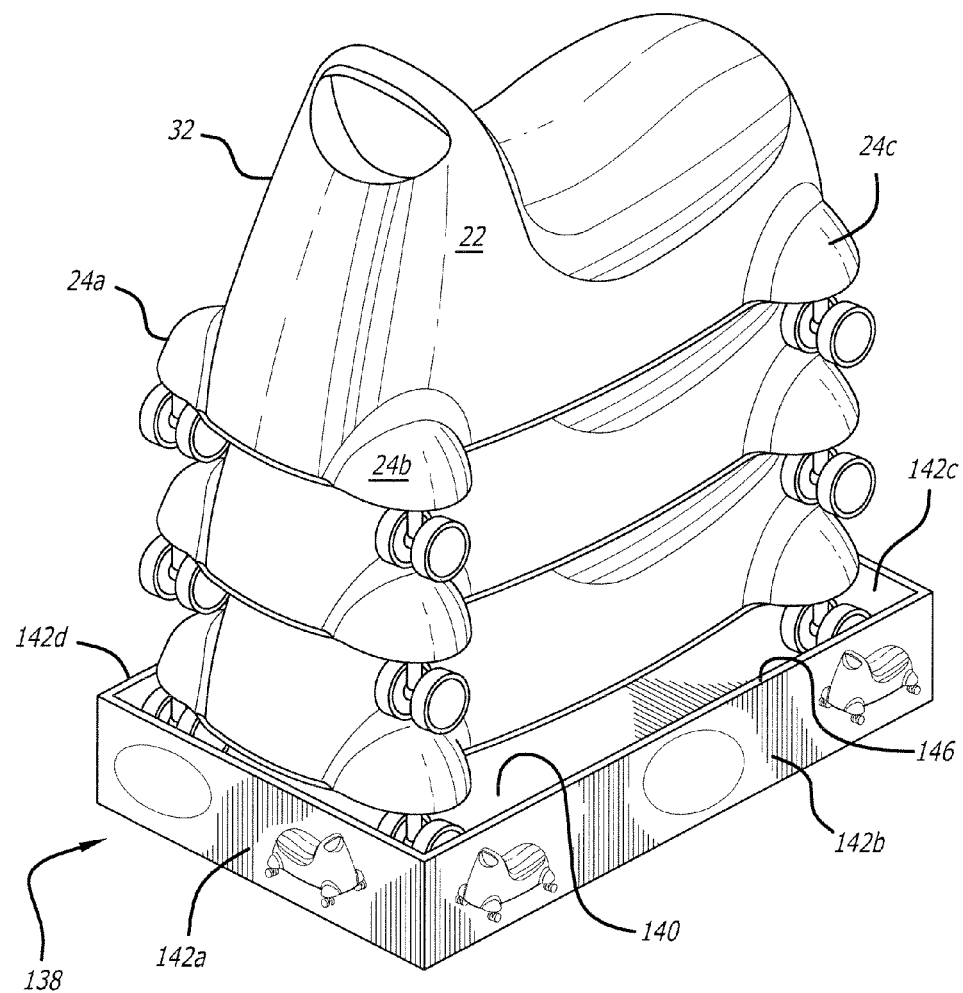
FIG. 10 is a perspective view of a number of the ride-on toys of FIGS. 1-7 in a stacked configuration for retail display and storage.

As illustrated in FIG. 10, the ride-on toy of FIGS. 1-7 may be stacked for ease of shipping, display and storage. With reference to the top-most toy of FIG. 10, this is due to the primarily open bottom and hollow construction of the toy body 22 and the outwardly extending shrouds 24a-24d. Preferably, the hollow bodies, including the handles, of the toys nest so that the bottom surface of the saddle valley and peak of each toy rests on the top surface of the saddle valley and peak below it. As a result, the saddle of each ride-on toy serves as a stacking surface.

The bottom-most toy may be positioned within a base, indicated in general at 138. The base 138, which is preferably constructed from cardboard, preferably features a bottom 140 and side walls 142a, 142b, 142c and 142d, which cooperate to define an open top 146. As illustrated in FIG. 10, advertising may be printed on the exterior surfaces of the side walls of the base.

With reference to FIG. 5, caster receptacles 150a and 150b are molded into body 20 under shrouds 24a and 24b. Each caster receptacle has a downward facing bore that receives caster mounts 152a and 152b so that the casters 26a and 26b may pivot 360° within respect to the toy body. Similar caster receptacles are provided under shrouds 24c and 24d (FIG. 4) and receive the caster mounts for casters 26c and 26d so that they also may rotate or pivot 360° with respect to the toy body.

Figure 11:
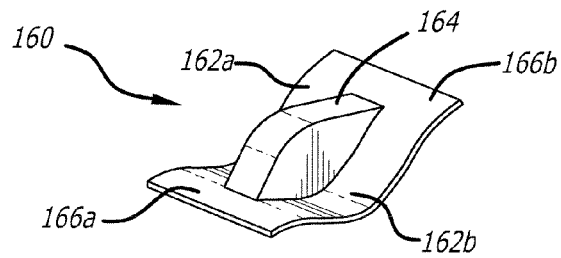
FIG. 11 is a perspective view of a caster stopper for use on the ride-on toys of FIGS. 1-7 and 10.
Figure 12:
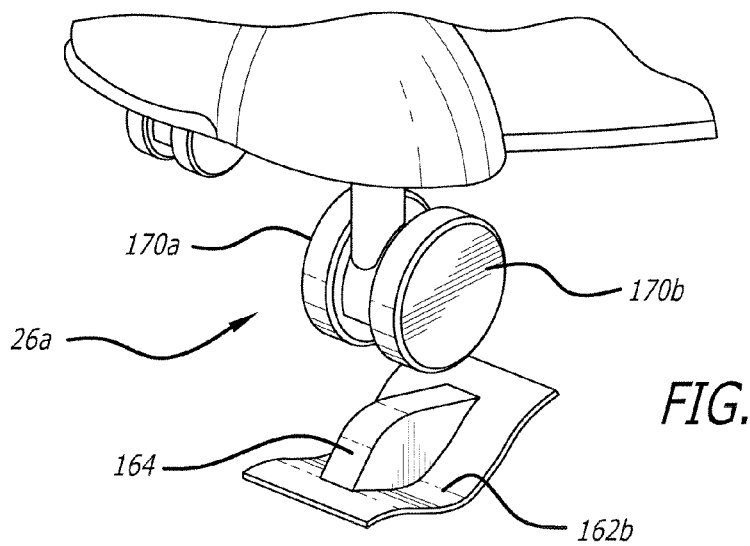
FIG. 12 is a perspective view of the caster stopper of FIG. 11 in the process of being installed on a caster of the ride-on toy of FIGS. 1-7 and 10.
Figure 13:
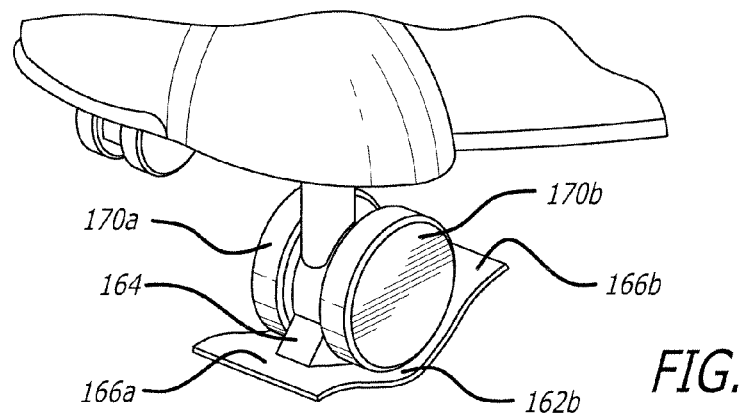
FIG. 13 is a perspective view of the caster stopper of FIGS. 11 and 12 installed on the ride-on toy of FIGS. 1-7.

A caster stopper, indicated in general at 160 in FIG. 11, includes a pair of support portions 162a and 162b, an insert portion 164 and a pair of wing portions 166a and 166b. As illustrated in FIGS. 12 and 13, the insert portion 164 of the caster stopper is inserted between the first and second wheels 170a and 170b of caster 26a in an interference fit fashion. As a result, caster wheel 170a is cradled by support portion 162a (FIG. 11) of the caster stopper while caster wheel 170b is cradled by support portion 162b of the caster stopper. Wing portions 166a and 166b and the rolling resistance provided by the support portions 162a and 162b of the caster stopper prevent caster wheels 170a and 170b from spinning during transport or when the toy is sitting on a shelf, whether with or without base 138 of FIG. 10 present. In addition, the caster stopper protects the top sides of the shrouds of a toy positioned below when in the stacked configuration illustrated in FIG. 10. While the caster stopper is preferably cut from a sheet of cardboard, other materials may be used.

While the preferred embodiments of the invention have been shown and described, it will be apparent to those skilled in the art that changes and modifications may be made therein Without departing from the spirit of the invention, the scope of which is defined by the appended claims.

What is claimed is:

1. A stackable ride-on toy comprising:
   a) a generally hollow body featuring a saddle, a handle and a primarily open bottom;
   b) a plurality of wheels mounted to the body adjacent said primarily open bottom;
   c) said saddle serving as a stacking surface adapted to support a first similar ride-on toy above the ride-on toy and to support the ride-on toy on top of a second similar ride-on toy below the ride-on toy with the hollow bodies of the ride-on toy and the first and second ride-on toys in a nested and stacked configuration; and
   d) said saddle including a saddle valley and a saddle peak, wherein the saddle valley features a cross-section that includes a curve formed by a radius in the range of 4.0 to 4.5 inches.

2. The stackable ride-on toy of claim 1 wherein the handle is generally hollow and adapted to be positioned within a first handle of a first similar ride-on toy above the ride-on toy and to receive a second handle of a second similar ride-on toy below the ride-on toy.

3. The stackable ride-on toy of claim 1 wherein a portion of the bottom of the body corresponding to the saddle valley has a width in the range of 8.0 to 8.5 inches.

4. The stackable ride-on toy of claim 3 wherein a height of a highest point of the saddle valley from a surface upon which the ride-on toy is supported is in the range of 8.0 to 10.0 inches.

5. A stackable ride-on toy comprising;
   a) a generally hollow body featuring a saddle, a handle and a primarily open bottom;
   b) a plurality of wheels mounted to the body adjacent said primarily open bottom;
   c) said saddle serving as a stacking surface adapted to support a first similar ride-on toy above the ride--on toy and to support the ride-on toy on top of a second similar ride-on toy below the ride-on toy with the hollow bodies of the ride-on toy and the first and second ride-on toys in a nested and stacked configuration; and
   d) said saddle including a saddle valley and a saddle peak, wherein the saddle peak features a cross-section that includes a curve formed by a radius in the range of 4.0 to 4.5 inches.

6. The stackable ride-on toy of claim 5 wherein a portion of the bottom of the body corresponding to the saddle peak has a width in the range of 8.0 to 8.3 inches.

7. The stackable ride-on toy of claim 6 wherein a height of a highest point of the saddle peak from a surface upon which the ride-on toy is supported is in the range of 8.4 to 10.6 inches.

8. A stackable ride-on toy comprising:
   a) a generally hollow body featuring a saddle, a handle and a primarily open bottom;
   b) a plurality of wheels mounted to the body adjacent said primarily open bottom,
   c) said saddle serving as a stacking surface adapted to support a first similar ride-on toy above the ride-on toy and to support the ride-on toy on top of a second similar ride-on toy below the ride-on toy with the hollow bodies of the ride-on toy and the first and second ride-on toys in a nested and stacked configuration; and
   d) said saddle including a saddle valley and a saddle peak, wherein the saddle peak and saddle valley each features a cross-section that includes a curve formed by a radius in the range of 4.0 to 4.5 inches.

9. The stackable ride-on toy of claim 8 wherein a portion of the bottom of the body corresponding to the saddle valley and a portion of the bottom of the body corresponding to the saddle peak each has a width in the range of 8.0 to 8.5 inches.

10. The stackable ride-on toy of claim 9 wherein a height of a highest point of the saddle valley from a surface upon which the ride-on toy is supported is in the range of 8.0 to 10.0 inches and a height of a highest point of the saddle peak is in the range of 8.4 to 10.6 inches.

11. The stackable ride-on toy of claim 1 wherein the handle is integrally molded with the body.

12. A stackable ride-on toy comprising:
   a) a generally hollow body featuring a saddle, a handle and a primarily open bottom;
   b) a plurality of wheels mounted to the body adjacent said primarily open bottom;
   c) said saddle serving as a stacking surface adapted to support a first similar ride-on toy above the ride-on toy and to support the ride-on toy on top of a second similar ride-on toy below the ride-on toy with the hollow bodies of the ride-on toy and the first and second ride-on toys in a nested and stacked configuration; and
   d) said handle including a handle bridge and an opening, said handle bridge including a plurality of downwardly facing sockets, said handle also including a handle gripping portion having an arcuate member and a plurality of knobs, said knobs engaging the sockets of the handle bridge in an interference or snap-fit fashion.

13. The stackable ride-on toy of claim 12 wherein the arcuate member and plurality of knobs are integrally molded from plastic.

14. The stackable ride-on toy of claim 1 further comprising a plurality of shrouds extending from the body, each of said shrouds supporting one of said plurality of wheels.

15. The stackable ride-on toy of claim 14 wherein the plurality of wheels are casters that rotate 360° with respect to the body.

16. The stackable ride-on toy of claim 1 wherein the plurality of wheels are casters that rotate 360° with respect to the body, each of said casters including a first wheel and a second wheel.

17. A stackable ride-on toy comprising:
- a) generally hollow body featuring a saddle, a handle and a primarily open bottom;
- b) a plurality of wheels mounted to the body adjacent said primarily open bottom, where the plurality of wheels are casters that rotate 360° with respect to the body, each of said casters including a first wheel and a second wheel;
- c) said saddle serving as a stacking surface adapted to support a first similar ride-on toy above the ride-on toy and to support the ride-on toy on top of a second similar ride-on toy below the ride-on toy with the hollow bodies of the ride-on toy and the first and second ride-on toys in a nested and stacked configuration; and
- d) a caster stopper including an pair of support portions, a pair of wing portions and an insert portion positioned between the pair of support portions and pair of wing portions, said insert portion positioned extending between the first wheel and the second wheel so that the first and second wheels are cradled one each on the pair of support portions of the caster stoppers, where the caster stopper is constructed from a sheet of cardboard.

18. The stackable ride-on toy of claim 5 wherein the plurality of wheels are casters that rotate 360° with respect to the body, each of said casters including a first wheel and a second wheel.

19. The stackable ride-on toy of claim 8 wherein the plurality of wheels are casters that rotate 360° with respect to the body, each of said casters including a first wheel and a second wheel.

20. The stackable ride-on toy of claim 12 wherein the plurality of wheels are casters that rotate 360° with respect to the body, each of said casters including a first wheel and a second wheel.

* * * * *